(12) United States Patent
Li et al.

(10) Patent No.: US 9,780,702 B2
(45) Date of Patent: Oct. 3, 2017

(54) ELECTRIC VEHICLE WITH IMPROVED ELECTRIC DRIVE SYSTEM

(71) Applicant: GENERAL ELECTRIC COMPANY, Schenectady, NY (US)

(72) Inventors: Fei Li, ShangHai (CN); Xi Lu, ShangHai (CN); Jian Zhou, ShangHai (CN); Pengju Kang, ShangHai (CN); Ronghui Zhou, ShangHai (CN); Xiangming Shen, ShangHai (CN); Fengcheng Sun, ShangHai (CN); Hai Qiu, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 146 days.

(21) Appl. No.: 14/202,506

(22) Filed: Mar. 10, 2014

(65) Prior Publication Data
US 2014/0265942 A1    Sep. 18, 2014

(30) Foreign Application Priority Data

Mar. 15, 2013    (CN) .......................... 2013 1 0084090

(51) Int. Cl.
*H02K 7/18* (2006.01)
*H02M 7/48* (2007.01)
(Continued)

(52) U.S. Cl.
CPC .............. *H02P 5/74* (2013.01); *B60L 3/0092* (2013.01); *B60L 11/1803* (2013.01);
(Continued)

(58) Field of Classification Search
CPC .................................................... B60L 11/123
(Continued)

(56) References Cited

U.S. PATENT DOCUMENTS 708,962 A    9/1902 Susie et al.
3,970,160 A    7/1976 Nowick
(Continued)

FOREIGN PATENT DOCUMENTS

CA    1120865 A1    3/1982
DE    19523985 A1    1/1996
(Continued)

OTHER PUBLICATIONS

Kominami et al., "A Novel Nine-Switch Inverter for Independent Control of Two Three-Phase Loads", Industry Applications Conference 2007 42nd IAS Annual Meeting Conference Record of The 2007 IEEE, pp. 2346-2350, Sep. 2007.
(Continued)

*Primary Examiner* — Eduardo Colon Santana
*Assistant Examiner* — Cortez Cook
(74) *Attorney, Agent, or Firm* — Meagher Emanuel Laks Goldberg & Liao, LLP

(57) ABSTRACT

An apparatus includes at least one energy source and a drive system coupled to the at least one energy source. The drive system converts electrical power received from the at least one energy source and provides converted electrical power for driving at least one load. The drive system includes a first converter, a second converter, and a first switch module coupled to outputs of the first and second converters. When the apparatus is operating under a first mode, the first switch module is switched to assume a first state to allow a first output electrical power provided from the first converter and a second output electrical power provided from the second converter to be combined for driving a first load with the combined output electrical power.

15 Claims, 11 Drawing Sheets

(51) Int. Cl.
*H02P 5/74* (2006.01)
*B60L 3/00* (2006.01)
*B60L 11/18* (2006.01)
*B60L 15/00* (2006.01)

(52) U.S. Cl.
CPC ......... *B60L 15/007* (2013.01); *B60L 2200/26* (2013.01); *B60L 2200/40* (2013.01); *B60L 2220/42* (2013.01); *Y02T 10/645* (2013.01); *Y02T 10/648* (2013.01); *Y02T 10/7005* (2013.01)

(58) Field of Classification Search
USPC .............. 318/139, 51; 290/40 C; 180/65.256
See application file for complete search history.

(56) References Cited

U.S. PATENT DOCUMENTS

| | | | |
|---|---|---|---|
| 4,180,138 A | 12/1979 | Shea | |
| 5,373,195 A | 12/1994 | De Doncker et al. | |
| 5,650,713 A * | 7/1997 | Takeuchi | B60K 6/46 180/65.245 |
| 6,023,137 A * | 2/2000 | Kumar | B60L 11/123 123/352 |
| 6,278,256 B1 | 8/2001 | Aoyama | |
| 6,622,069 B1 | 9/2003 | Davis et al. | |
| 6,834,626 B1 | 12/2004 | Holmes | |
| 7,199,535 B2 * | 4/2007 | Welchko | B60L 11/12 307/65 |
| 7,956,558 B2 | 6/2011 | Cull et al. | |
| 2001/0013702 A1 * | 8/2001 | Yanase | B60K 6/46 290/40 C |
| 2003/0090225 A1 | 5/2003 | Posma et al. | |
| 2004/0222754 A1 * | 11/2004 | Ochiai | B60L 3/0046 318/105 |
| 2005/0243584 A1 * | 11/2005 | Abe | H02M 7/493 363/71 |
| 2006/0227579 A1 * | 10/2006 | Glauser | H02J 9/062 363/71 |
| 2009/0115358 A1 * | 5/2009 | Kachi | B60K 6/445 318/139 |
| 2010/0099532 A1 * | 4/2010 | Cashen | B60K 6/365 475/5 |
| 2012/0049773 A1 * | 3/2012 | Muraho | H02P 27/06 318/400.3 |
| 2013/0241444 A1 * | 9/2013 | Fotherby | H02M 7/48 318/51 |
| 2014/0070753 A1 * | 3/2014 | Concannon | G01M 15/04 318/671 |

FOREIGN PATENT DOCUMENTS

| | | |
|---|---|---|
| EP | 1110799 A2 | 6/2001 |
| WO | 2010151775 A1 | 12/2010 |
| WO | 2011088203 A1 | 7/2011 |

OTHER PUBLICATIONS

Krishnaraj et al., "A Hybrid Switching Loss Reduction Technique Along with Independent Control of Two Three Phase Loads for Nine Switch Space Vector Modulated Inverter", International Journal of Engineering Science and Technology (IJEST), pp. 1-10, vol. 3, Issue 3, Mar. 2011.

Sharifian et al., "Two Machine Single Inverter Deriving System for Electrical Vehicles", Electrical Machines and Systems (ICEMS), 2011 International Conference on, pp. 1-5, Aug. 2011.

European Search Report and Written Opinion issued in connection with corresponding EP Application No. 14160004.9-1807 dated Dec. 3, 2014.

Anonymous, "BMW Lexikon : xDrive", Dec. 9, 2012.

Unofficial English Translation of Chinese Office Action issued in connection with corresponding CN Application No. 201310084090.2 on Oct. 26, 2015.

* cited by examiner

ELECTRIC VEHICLE WITH IMPROVED ELECTRIC DRIVE SYSTEM

BACKGROUND

Embodiments of the disclosure relate generally to improved electric drive systems used in apparatuses such as electric vehicles.

Vehicles are mobile machines that are designed and used for transporting passengers and/or cargos from one place to another. Examples of the vehicles may include bicycles, cars, trucks, locomotives, tractors, buses, boats, and aircrafts. Traditionally, at least some of these vehicles are powered by engines such as internal combustion engines. The internal combustion engines may operate by burning fuels such as diesels, gasoline, and natural gas for providing necessary power so as to drive motion of the vehicles. However, with rising concerns of scarcity, cost, and negative environmental impact in association with the use of the diesels, gasoline, and natural gas, growing interests have been raised to develop electric powered vehicles such as fully/pure electric vehicles, hybrid electric vehicles (e.g., integration of a battery and internal combustion engine), and plug-in hybrid electric vehicles.

At least some of the electric powered vehicles are provided with two sets of electric motors. One is traction electric motor which is used to provide traction power for driving movement of the vehicle. The other is auxiliary electric motor which is used to provide drive power for performing various tasks such as lifting cargoes, plowing ground, and dumping materials. Typically, the traction electric motor is powered by a first converter (e.g., an inverter), and the output electrical power of the first converter is regulated by a traction motor controller. The auxiliary electric motor is powered by a second converter (e.g., an inverter), and the output electrical power of the second converter is regulated by an auxiliary motor controller which is independent from the traction motor controller. Due to this separate controller configurations, the first converter and the traction motor controller should be designed to provide desired output electrical power such that the traction motor can be operated to provide maximum output traction power for driving movement of the vehicle. Similarly, the second converter and the auxiliary motor controller should be designed to provide desired output electrical power such that the auxiliary motor can provide maximum output torque for performing certain tasks. However, in normal operations of the electric vehicles, the traction electric motor and the auxiliary electric motor typically are not operated to provide their maximum output electric power simultaneously. Thus, in most cases, the full capability of the electric drive system consisting of the first converter, the traction motor controller, the second converter, and the auxiliary motor controller is not sufficiently explored.

Therefore, it is desirable to provide electric vehicles with improved electric drive system.

BRIEF DESCRIPTION

In accordance with one aspect of the present disclosure, an apparatus is provided. The apparatus includes at least one energy source and a drive system coupled to the at least one energy source. The drive system is configured to convert electrical power received from the at least one energy source and provide converted electrical power for driving at least one load. The drive system includes a first converter, a second converter, and a first switch module coupled to an output of the first converter and an output of the second converter. When the apparatus is operating under a first mode, the first switch module is switched to assume a first state to allow a first output electrical power provided from the first converter and a second output electrical power provided from the second converter to be combined for driving a first load with the combined output electrical power.

In accordance with another aspect of the present disclosure, a vehicle is provided. The vehicle includes a first direct current (DC) to alternative current (AC) converter, a second DC-to-AC converter, a controller, a first electric motor, and a second electric motor. The controller is coupled to the first DC-to-AC converter and the second DC-to-AC converter. The controller is configured to send respective control signals to the first and second DC-to-AC converters to enable the first and second DC-to-AC converters to perform power conversion. The first electric motor is coupled to the first DC-to-AC converter. The second electric motor is coupled to the second DC-to-AC converter. When the vehicle is operating under a first mode, the first electric motor and the second electric motor are separately powered by the first and second DC-to-AC converters. When the vehicle is operating under a second mode, the first electric motor is powered by both the first and second DC-to-AC converters, and the second electric motor is not operating.

In accordance with yet another aspect of the present disclosure, another vehicle is provided. The vehicle includes a first converter, a second converter, a third converter, a controller, a first electric motor, and a second electric motor. The controller is coupled to the first, second, and third converters. The controller is configured to send respective control signals to the first, second, and third converters to enable the first, second, and third converters to perform power conversion. The first electric motor is coupled to the first converter. The second electric motor is coupled to the second converter. The third converter is configured to selectively supply electric power to either the first electric motor or the second electric motor depending on operation mode of the vehicle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
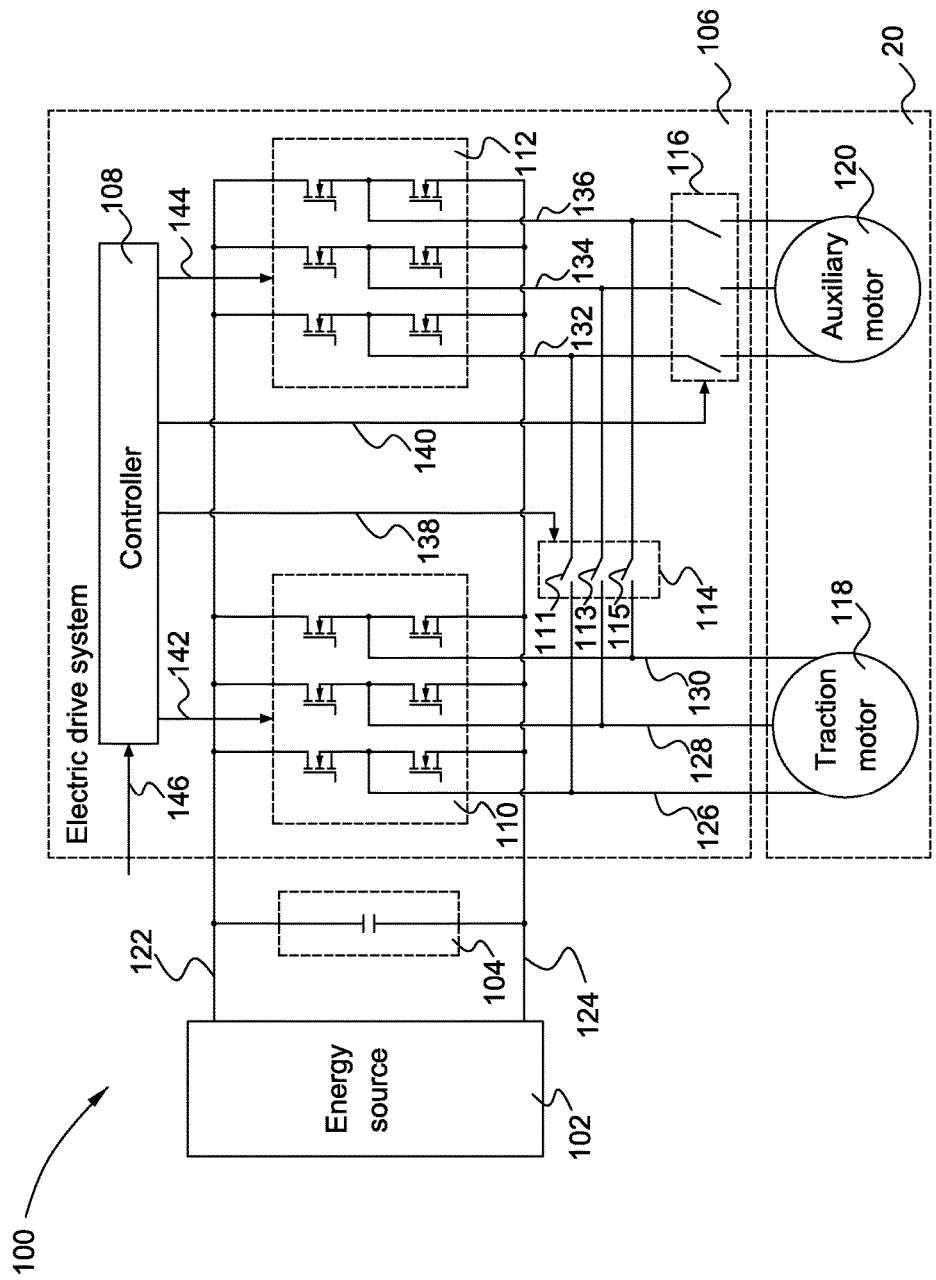
FIG. 1 is a schematic diagram of a vehicle in accordance with an exemplary embodiment of the present disclosure.

Embodiments disclosed herein generally relate to an improved electric drive system used in vehicles. The electric drive system used in the vehicles can be configured to drive at least one traction motor and at least one auxiliary motor. In some embodiments, the electric drive system may include at least a first converter and a second converter. The first converter is specifically designed to make its maximum output electrical power to be less than the electrical power that the traction motor needs to provide maximum output traction torque. As such, in some operation modes, when the traction motor is desired to provide the maximum output traction torque, the second converter can be controlled to provide supplementary electrical power, which is combined with the output electrical power provided from the first converter. In some embodiments, at least one switching means is employed to selectively combine the output electrical power provided from the first and second converters. More specifically, in some operation modes, the switching means can be operated to assume a first state to establish power transmission path between the second converter and the traction motor to allow both the first and the second converters to supply electrical power to the traction motor. In some other operation modes, the switching means can be operated to assume a second state to cut off or terminate the power transmission path between the second converter and the traction motor to allow the traction motor to be solely powered by the first converter.

In some embodiments, the electric drive system may further include a third converter. In the three-converter configurations, the second converter can be specifically designed to make its maximum output electrical power to be less than the electrical power that the auxiliary motor needs to provide a maximum output torque. When the auxiliary motor is desired to be operated to provide the maximum output torque, electrical power provided from the second converter and the third converter can be combined and the combined electrical power is supplied to the auxiliary motor. Similarly, another switching means can be operated to establish or terminate electrical transmission path between the third converter and the auxiliary motor to enable or disable the power transfer between the third converter and the auxiliary motor.

The present disclosure can achieve various technical effects or technical advantages. One is that for the same traction motor and/or auxiliary motor rated to have a certain motor power, at least one of the first converter and the second converter can be designed to have less output electrical power capability in comparison to conventional converters. Designing the first and second power converters with less output electrical power capability can allow a cost-effective electric drive system to be provided. Other technical effects or technical advantages will become apparent to those skilled in the art by referring to the detailed descriptions provided herein and the accompanying drawings.

In an effort to provide a concise description of these embodiments, not all features of an actual implementation are described in the one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "circuit," "circuitry," and "controller" may include either a single component or a plurality of components, which are either active and/or passive components and may be optionally connected or otherwise coupled together to provide the described function.

Turning now to the drawings, first referring to FIG. 1, in which there is shown a schematic diagram of a vehicle 100 in accordance with one exemplary embodiment of the present disclosure. As used herein, the "vehicle" may be any suitable mobile machines that are designed and used for transporting passengers and/or cargos from one place to another. Examples of the vehicles may include bicycles, cars, trucks, locomotives, tractors, buses, boats, and aircrafts. In some embodiments of the present disclosure, the vehicle 100 may be configured to use electric motors to provide driving force so as to drive movement of the vehicle and/or to perform specific tasks. For example, in some embodiments, the vehicle 100 may be an electric tractor which can be provided with a traction motor and a power take-off (PTO) motor. In other embodiments, the vehicle 100 may also include a forklift.

As shown in FIG. 1, the vehicle 100 may include an electric drive system 106 which is coupled between an energy source 102 and a load system 20. In one aspect, when the vehicle 100 is operating in a driving mode, the electric drive system 106 is configured to receive input electrical power provided from the energy source 102 and provide output electrical power converted from the input electrical power for driving the load system 20. In another aspect, when the load system 20 is operating in a regenerative mode or is braking, the electric drive system 106 may be further configured to convert regenerative electrical power provided from the load system 20 to a recoverable electrical power. In one embodiment, the recoverable electrical power may be used to charge the energy source 102. In other embodiments, the recoverable electrical power may be used for other purposes, such as heating.

In some embodiments, the input electrical power provided from the energy source 102 may include a direct current (DC) power, an alternating current (AC) power, and a combination thereof. For example, in some embodiments, one or more batteries or battery packs, including but not limited to, lead acid batteries, nickel cadmium batteries (NiCd), nickel metal hydride batteries (NiMH), lithium ion batteries, and lithium polymer batteries, etc., may be used to provide DC power to the electric drive system 106. In other embodiments, hydrogen fuel, biofuel, natural gas, fuel cells, flywheels, a combination thereof, and any other energy supply means may be used to provide electrical power to the electric drive system 102.

In some embodiments, the energy source 102 may be an onboard device that is integrated with the vehicle 100. In other embodiments, the energy source 102 may be located outside of the vehicle 100. For example, the vehicle 100 may be provided with an onboard power interface (not shown) which can be electrically coupled to a power grid. The onboard power interface may be configured to receive electrical power from the power grid and convert the received electrical power into an appropriate form (e.g., a DC power) which is supplied to the electric drive system 100. The onboard power interface may also be configured to charge the energy source 102 when the power stored in the energy source 102 is at least partially depleted. Still in some embodiments, the energy source 102 may be a combination of an onboard energy storage device and an onboard power interface that is capable of electrically coupled to an external power source for receiving electrical power from the external power source.

Further referring to FIG. 1, in the illustrated embodiment, the input electrical power provided from the energy source 102 is a DC electrical power. The DC electrical power is delivered to the electric drive system 106 via a first electrical line 122 and a second electrical line 124 coupled between the energy source 102 and the electric drive system 106. In some embodiments, a DC link 104 is coupled between the energy source 102 and the electric drive system 106. The DC link 104 may include one or more capacitors that may be coupled in series or in parallel. The DC link 104 may be configured to filtering the DC electrical power from the energy source 102 and provide DC electrical power with a constant voltage to the electric drive system 106. To facilitate description, the DC link 104 is shown as an external element of the electric drive system 106. However, in some embodiments, the DC link 104 may be integrated within the electric drive system 106.

Further referring to FIG. 1, the electric drive system 106 may include a first converter 110, a second converter 112, a controller 108, a first switch module 114, and a second switch module 116. In the illustrated embodiment, the first converter 110 and the second converter 112 are commonly coupled to the energy source 102 via the DC link 104. The two converters 110, 112 are supplied with the same input electrical power from the energy source 102. The first converter 110 and the second converter 112 may be arranged to have the same configuration or different configurations. For example, in some embodiments, both of the first and second converters 110, 112 are arranged to have a full-bridge configurations. As shown in FIG. 1, each of the first and second converters 110, 112 include six switches which can be turned on and/or off to perform power conversion according to control signals supplied from the controller 108. As used herein, the switches that can be turned on and/off for performing power conversion may include any suitable type of semiconductor-based switching devices, such as insulated gate bipolar transistors (IGBTs), gate communicated thyristors (GCTs), metal oxide semiconductor field effect transistors (MOSFETs), and silicon carbide (SiC) based devices. In other embodiments, the first and second converters 110, 112 may be arranged to have other configurations, such as multi-level topology, neutral point clamped (NPC) topology, flying capacitor topology, and H-bridge topology.

With continued reference to FIG. 1, the first converter 110 may be configured to perform unidirectional or bi-directional power conversion. In the illustrated embodiment, the first converter 110 may comprise a three-phase DC-AC converter (can also be referred to as a three-phase inverter). The first converter 110 is configured to convert the input DC electrical power received from the energy source 102 to first three-phase AC electrical power. The first three-phase AC electrical power is transmitted to the load system 20 at least along a first electrical line 126, a second electrical line 128, and a third electrical line 130. Also, the first converter 110 may be configured to convert first three-phase AC electrical power to DC electrical power. As such, the energy source 102 can be charged with the DC electrical power.

The second converter 112 may comprise a similar three-phase DC-AC converter or inverter as the first converter 110. The second converter 112 is configured to convert the input DC electrical power received from the energy source 102 to second three-phase AC electrical power. The second three-phase AC electrical power is transmitted to the load system 20 at least along a fourth electrical line 132, a fifth electrical line 134, and sixth electrical line 136. Also, the second converter 112 may be configured to convert second three-phase AC electrical power to DC electrical power for charging the energy source 102.

The first three-phase AC electrical power supplied from the first converter 110 can be regulated according to first control signals 142 provided from the controller 108. The second three-phase AC electrical power supplied from the second converter 112 can be regulated according to second control signals 144 provided from the controller 108. As used herein, the controller 108 may include any suitable programmable circuits or devices such as a digital signal processor (DSP), a field programmable gate array (FPGA), a programmable logic controller (PLC), and an application specific integrated circuit (ASIC). The controller 108 may be configured to generate the first control signals 142 and second control signals 144 by implementing one or more software programs or algorithms according to various input signals 146, such as command signals (e.g., torque command) and/or feedback signals (e.g., motor feedback voltage and/or motor feedback current).

Further referring to FIG. 1, the first converter 110 is arranged to have a fixed power transmission path with a first load 118 of the load system 20 via the first, second, and third electrical lines 126, 128, 130. In the illustrate embodiment, the first load 118 is a traction motor which is arranged to provide a drive power (e.g., a traction torque) for driving movement of the vehicle 100. With the fixed power transmission path, the first three-phase AC electrical power provided from the first converter 110 can always be supplied to the first load 118. In a particular embodiment, the first converter 110 is specifically designed to have its maximum output electrical power to be less than the maximum electrical power that the first load 118 requires for providing a maximum drive power. Thus, in case the traction motor of the first load 118 is desired to provide a maximum drive power, the first three-phase AC electrical power provided from the first converter 110 can be supplemented by the second converter 112.

Further referring to FIG. 1, the output of the second converter 112 is electrically coupled to the output of the first converter 110 via the first switch module 114. The first switch module 114 is configured to be switched to assume a first state (e.g., turned on or closed) to establish a power transmission path between the second converter 112 and the first load 118. As such, the second three-phase AC electrical power can be combined with the first three-phase AC electrical power provided from the first converter 110 and the combined three-phase AC electrical power can be supplied to the first load 118 to enable the first load 118 to provide main drive power such as traction torque. The first switch module 114 is further configured to be switched to assume a second state (e.g., turned off or opened) to cut off or terminate the power transmission path between the second converter 112 and the first load 118. As such, the first load 118 can be solely powered by the first converter 110. As used herein, "turned off" and "opened" may refer to an "OFF" status of a switch that high impedance is created by operating the switch.

In a more specific embodiment, the first switch module 114 may include three sub-switches and each sub-switch is associated with a pair of electrical lines. For example, a first sub-switch 111 is electrically connected between a first pair of electrical lines of 126, 132, a second sub-switch 113 is electrically connected between a second pair of electrical lines 128, 134, and a third sub-switch 115 is electrically connected between a third pair of electrical lines 130, 136. In one embodiment, the three sub-switches 111, 113, 115 can be turned on and/or off simultaneously according to first switching signal 138 provided from the controller 108. In other embodiments, the three sub-switches 111, 113, 115 can be turned on and/or off independently. Still in some embodiments, the three sub-switches 111, 113, 115 can be operated manually to establish and/or terminate power transmission path.

Further referring to FIG. 1, the second converter 112 is electrically coupled to the second load 120 via the second switch module 116. The second switch module 116 is configured to be switched to assume a first state (e.g., turned on or closed) to establish a power transmission path between the second converter 112 and the second load 120. As such, the second three-phase AC electrical power can be provided to the second load 120 via the three electrical lines 132, 134, 136. As used herein, "closed" may refer to an "ON" status of a switch that low impedance is created by operating the switch. The second switch module 116 is further configured to be switched to assume a second state (e.g., turned off or opened) to terminate the power transmission path between the second converter 112 and the second load 120. In some circumstances, disconnecting the second load 120 from the second converter 120 is useful. For example, an auxiliary motor of the second load 120 can be protected when over-speed operation of the auxiliary motor 120 is detected. Similarly, the second switch module 116 may include three sub-switches that be turned on and/or off according to second switching signal 140 supplied from the controller 108.

Further referring to FIG. 1, in some embodiments, the first load 118 may include a traction motor such as a three-phase AC motor which can be operated to provide main drive power (e.g., traction torque) for driving movement of the vehicle 100. The second load 120 may include an auxiliary motor (can also be referred to as a PTO motor) such as a three-phase AC motor which can be operated to provide auxiliary drive power to perform certain tasks such as mowing plants, plowing ground, lifting materials, shoveling materials, excavating materials, and dumping materials. Both the traction motor 118 and the auxiliary motor 120 can be controlled to provide different traction torques depending on different operation modes or requirements of the vehicle 100.

As shown in FIG. 1, the first load 118 (e.g., the traction motor) and the second load 120 (e.g., the auxiliary motor) are shown as external elements of the electric drive system 106. In some embodiments, one or both of the first load 118 and the second load 120 may be integrated into the electric drive system 106 to form a module.

Figure 2:
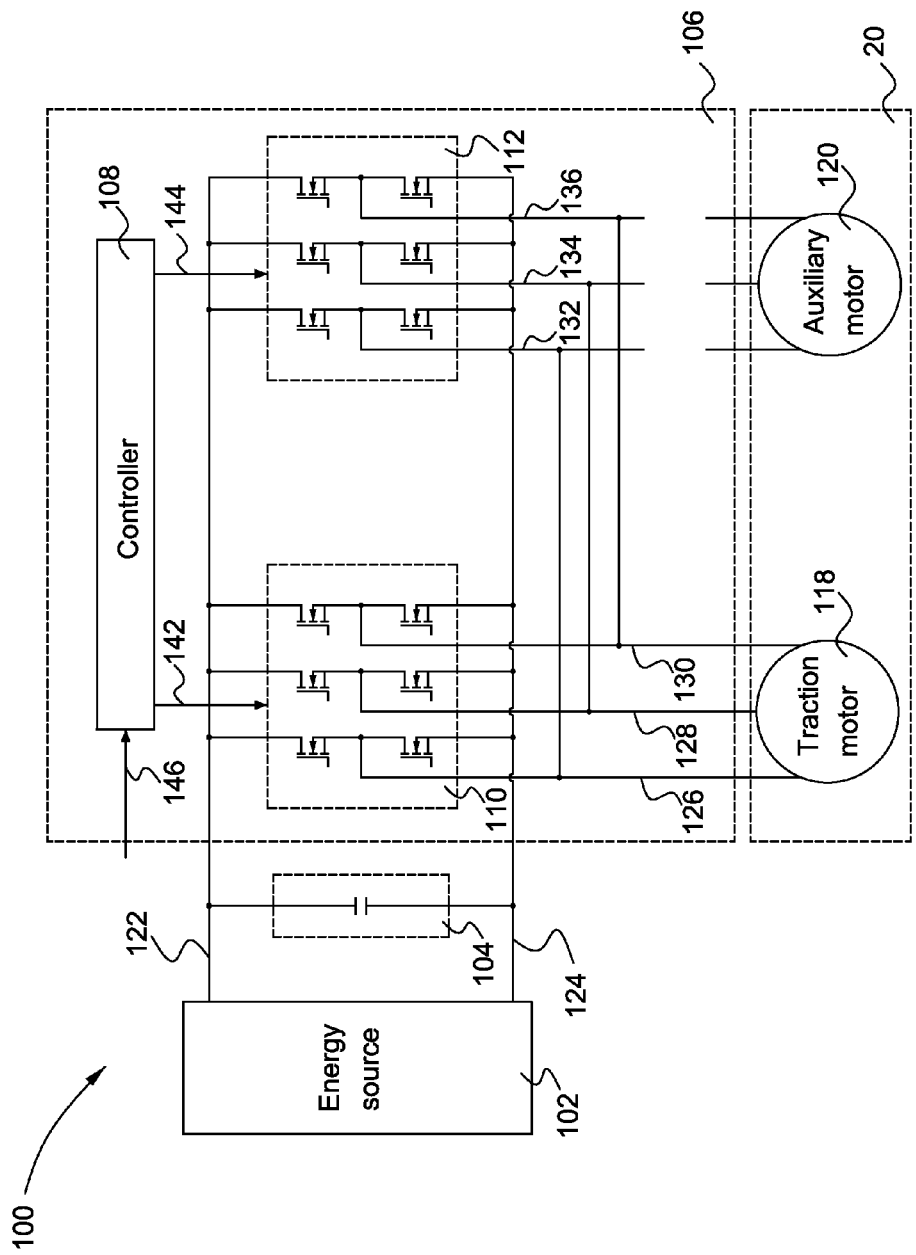
FIG. 2 is a schematic diagram of the vehicle shown in FIG. 1 operating in a first mode in accordance with an exemplary embodiment of the present disclosure.

Referring now to FIG. 2, which illustrates a first configuration of the electric drive system 106 shown in FIG. 1 when the vehicle is operating under a first operation mode. In one embodiment, the first operation mode may be a starting mode or an accelerating mode, in which the traction motor 118 may be operated to provide a maximum traction torque and the auxiliary motor 120 may be not operating. In this case, as shown in FIG. 2, the first switch module 114 can be turned on or closed such that the first three-phase AC electrical power provided from the first converter 110 and the second three-phase AC electrical power provided from the second converter 112 can be combined. The combined three-phase AC electrical power is supplied to the traction motor 118 to allow the maximum traction torque to be provided. In addition, under the first operation mode, the second switch module 116 can be turned off or opened to disconnect the auxiliary motor 120 from the second converter 112.

Figure 3:
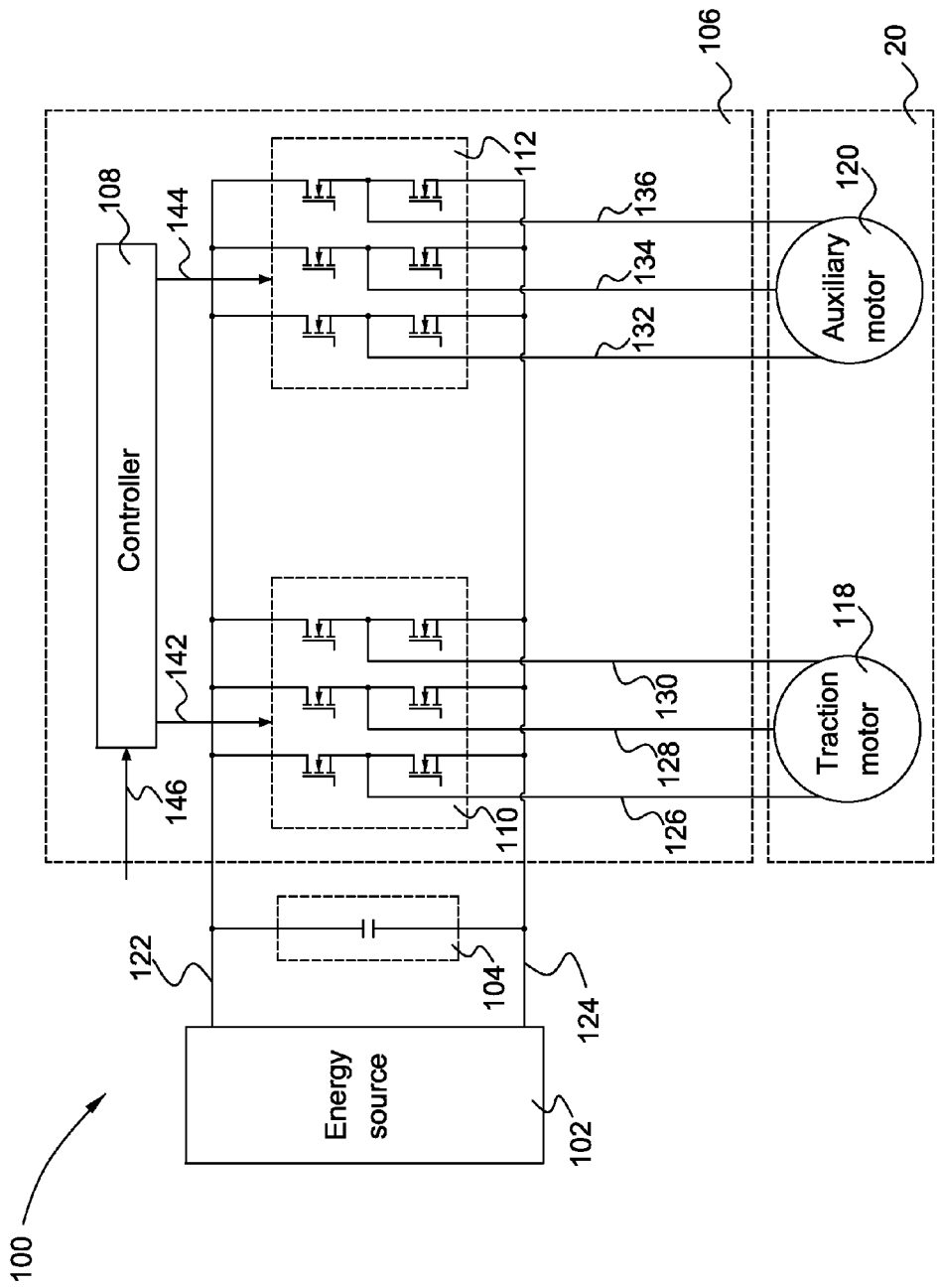
FIG. 3 is a schematic diagram of the vehicle shown in FIG. 1 operating in a second mode in accordance with an exemplary embodiment of the present disclosure.

Referring to FIG. 3, which illustrates a second configuration of the electric drive system 106 shown in FIG. 1 when the vehicle 100 is operating under a second operation mode. In one embodiment, under the second operation mode, the vehicle 100 may be configured to perform certain tasks such as plowing ground or lifting materials. In this case, the traction motor 118 should be operated to provide relatively small main drive power and the auxiliary motor 120 should be operated to provide large auxiliary drive power. As shown in FIG. 3, because the first switch module 114 is turned off or opened, there is not power transmission path between the traction motor 118 and the output of the second converter 112. Therefore, the traction motor 118 is solely powered by the first converter 110. The amount of the first three-phase AC electrical power provided from the first converter 110 can be adjusted according to the first control signals 142 provided from the controller 108. Consequently, the traction motor 118 can provide relatively small traction torque for maintaining a movement of the vehicle 100.

Further referring to FIG. 3, still under the second operation mode, because the second switch module 116 is turned on or closed, a power transmission path is established between the second converter 112 and the auxiliary motor 120. The auxiliary motor 120 is solely powered by the second converter 112. The amount the second three-phase AC electrical power supplied to the auxiliary motor 120 can be adjusted according to the second control signals 144 provided from the controller 108. Therefore, the second three-phase AC electrical power can be changed to allow the auxiliary motor 120 to provide variable auxiliary drive power to perform specific tasks.

Figure 4:
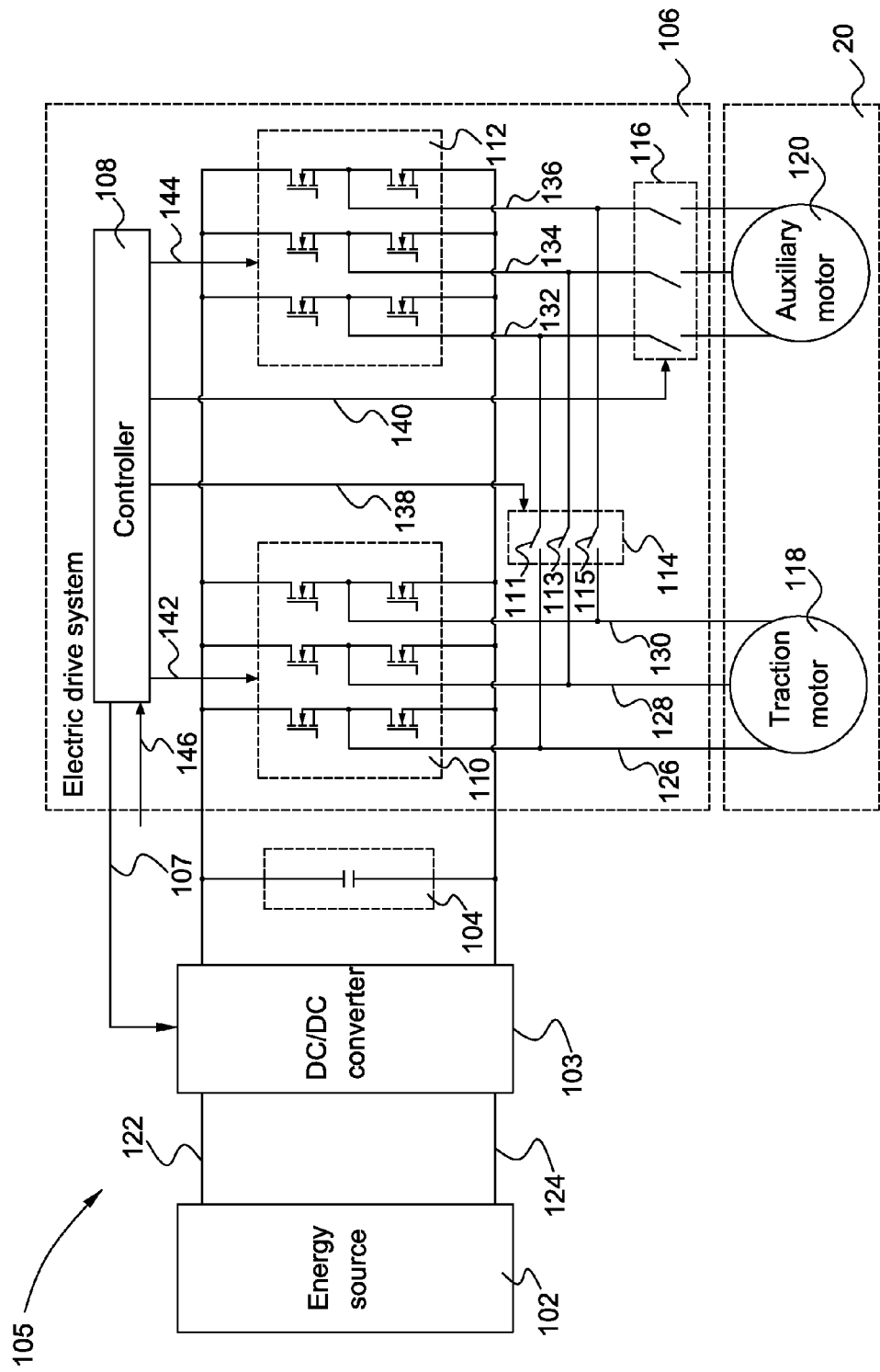
FIG. 4 is a schematic diagram of a vehicle in accordance with another exemplary embodiment of the present disclosure.

FIG. 4 illustrates a schematic diagram of a vehicle 105 in accordance with another exemplary embodiment of the present disclosure. The general structure of the vehicle 105 shown in FIG. 4 is substantially similar to the vehicle 100 shown and described above with reference to FIG. 1. Thus, elements which are similar as those shown in FIG. 1 are designated with the same reference numerals in FIG. 4.

As shown in FIG. 4, different than the vehicle 100 shown in FIG. 1 which supplies electrical power to the first and second converters 110, 112 directly from the energy source 102, the vehicle 105 may indirectly supplies electrical power extracted from the energy source 102 to one or more converters of the vehicle 105. In one embodiment, the vehicle 105 further include a front-stage convert 103 which has its input coupled to the energy source 102 via first electrical line 102 and second electrical line 104, and its output coupled to both the first converter 110 and the second converter 112. In one embodiment, the front-stage converter 103 is a DC/DC converter 103 which is configured to convert first DC electrical power provided from the energy source 102 to second DC electrical power. The second DC electrical power is supplied to both the first converter 110 and the second converter 112.

In some embodiments, the DC/DC converter 103 can also be configured to perform bi-directional power conversions. For example, the DC/DC converter 103 can be configured to convert first DC electrical power provided from the first converter 110 or the second converter 112 to second DC electrical power for charging the energy source 102.

In some embodiments, the DC/DC converter 103 may be configured to regulate the DC electrical power supplied to the first and second converters 110, 112 or DC electrical power supplied to the energy source 102 according to control signals 107 provided from the controller 108. For example, the DC/DC converter 103 may be configured to provide the second DC electrical power having a DC voltage level higher than the DC voltage level of the first DC electrical power received from the energy source 102 (i.e., boosting the DC electrical power). In other embodiments, the DC/DC converter 103 may be configured to provide the second DC electrical power having a DC voltage level lower than the DC voltage level of the first DC electrical power received from the first converter 110 or the second converter 112 (i.e., bucking the DC electrical power).

Figure 5:
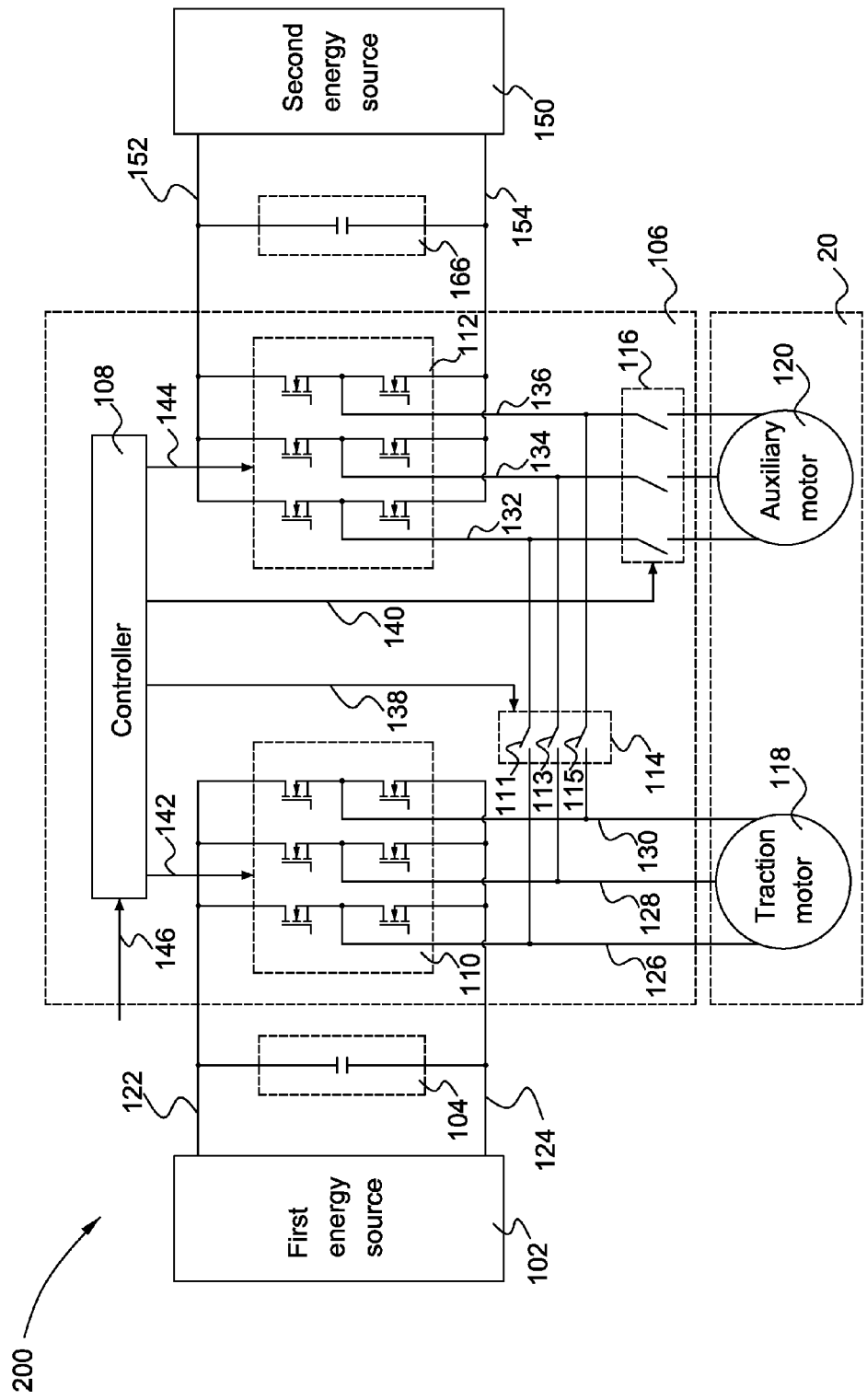
FIG. 5 is a schematic diagram of a vehicle in accordance with another exemplary embodiment of the present disclosure.

FIG. 5 illustrates a schematic diagram of a vehicle 200 in accordance with another exemplary embodiment of the present disclosure. The general structure of the vehicle 200 shown in FIG. 5 is substantially similar to the vehicle 100 shown and described above with reference to FIG. 1. Thus, elements which are similar as those shown in FIG. 1 are designated with the same reference numerals in FIG. 1.

Comparing to the vehicle 100 shown in FIG. 1, one of the differences of the vehicle 200 shown in FIG. 5 is that the first converter 110 and the second converter 112 are coupled to a first energy source 102 and a second energy source 150, respectively. More specifically, the first converter 110 is electrically coupled to the first energy source 102 via first and second input electrical lines 122, 124. In some embodiments, a first DC-link 104 is coupled between the first energy source 102 and the first converter 110 for maintaining first DC electrical power supplied to the first converter 110 at a constant voltage. In some embodiments, the first converter 110 is configured to convert the first DC electrical power provided from the first energy source 102 to first output electrical power. In the illustrated embodiment, the first output electrical power is a three-phase AC electrical power which is supplied to drive a three-phase AC electric motor. In other embodiments, the first output electrical power may be a single-phase or multi-phase electrical power supplied to drive single-phase or multi-phase electric motors, respectively. In some embodiments, the first converter 110 may include a bi-directional converter. For example, when the vehicle 200 is operating under a regenerative mode, the first converter 110 may be further configured to convert three-phase AC electrical power provided from the traction motor 118 to DC electrical power. The DC electrical power may be used to charge the first energy source 102 or for any other purposes such as heating.

The second converter 112 is electrically coupled to the second energy source 150 via third and fourth input electrical lines 152, 154. In some embodiments, a second DC-link 166 may be coupled between the second energy source 150 and the second converter 112 for maintaining second DC electrical power supplied to the second converter 112 at a constant voltage. In some embodiments, the second converter 112 is configured to convert second DC electrical power supplied from the second energy source 150 to second output electrical power. In the illustrated embodiment, the second output electrical power is a three-phase AC electrical power which is supplied to drive a three-phase AC electric motor. In other embodiments, the second output electrical power may be single-phase or multi-phase electrical power supplied to drive single-phase or multi-phase electric motors, respectively. In some embodiments, the second converter 112 may include a bi-directional converter. For example, when the vehicle 200 is operating under a regenerative mode, the second converter 112 may be further configured to convert three-phase AC electrical power provided from the auxiliary motor 120 to DC electrical power. The DC electrical power may be used to charge the energy source 102 or for any other purposes such as heating.

Further referring to FIG. 5, depending on the operation modes of the vehicle 200, the first output electrical power provided from the first converter 110 can be solely provided to the traction motor 118 or be provided in combination with the second output electrical power from the second converter 112 to the traction motor 118. For example, when the vehicle 200 is instructed to be operating under a first operation mode (e.g., starting mode or accelerating mode), the first switch module 114 can be turned on or closed according to a first switching signal 138 provided from the controller 108 to establish an electrical transmission path between the second converter 112 and the traction motor 118. The second output electrical power provided from the second converter 112 can be transmitted along the electrical transmission path and be combined with the first output electrical power provided from the first converter 110. Then, the combined electrical power can be supplied to the traction motor 118 to enable main drive power (e.g., maximum traction torque) to be provided. Still in the first operation mode, the second switch module 116 may be turned off or opened according to a second switching signal 140 provided from the controller 108, such that the auxiliary motor 120 is disconnected from the second converter 112, or the auxiliary motor 120 stops operating.

Further referring to FIG. 5, when the vehicle 200 is instructed to be operating under a second operation mode (e.g., plowing ground), the first switch module 114 can be turned off or opened according to the first switching signal 138 provided from the controller 108 to terminate the electrical transmission path between the second converter 112 and the traction motor 118. In this case, the traction motor 118 only receives the first output electrical power provided from the first converter 110 and provides necessary main drive power for driving movement of the vehicle 200. Under the second operation mode, the second switch module 116 can be turned on or closed to establish a power transmission path between the second converter 112 and the auxiliary motor 120. Then, the auxiliary motor 120 can receive the second electrical power provided from the second converter 112 and provide necessary auxiliary drive power for performing certain tasks, such as plowing ground and lifting materials. In some embodiments, under the second operation mode, the second switch module 116 can also be turned off or opened to protect the auxiliary motor 120 from abnormal conditions. For example, the second switch module 116 can be opened when an over-speed operating condition of the auxiliary motor 120 is detected.

Figure 6:
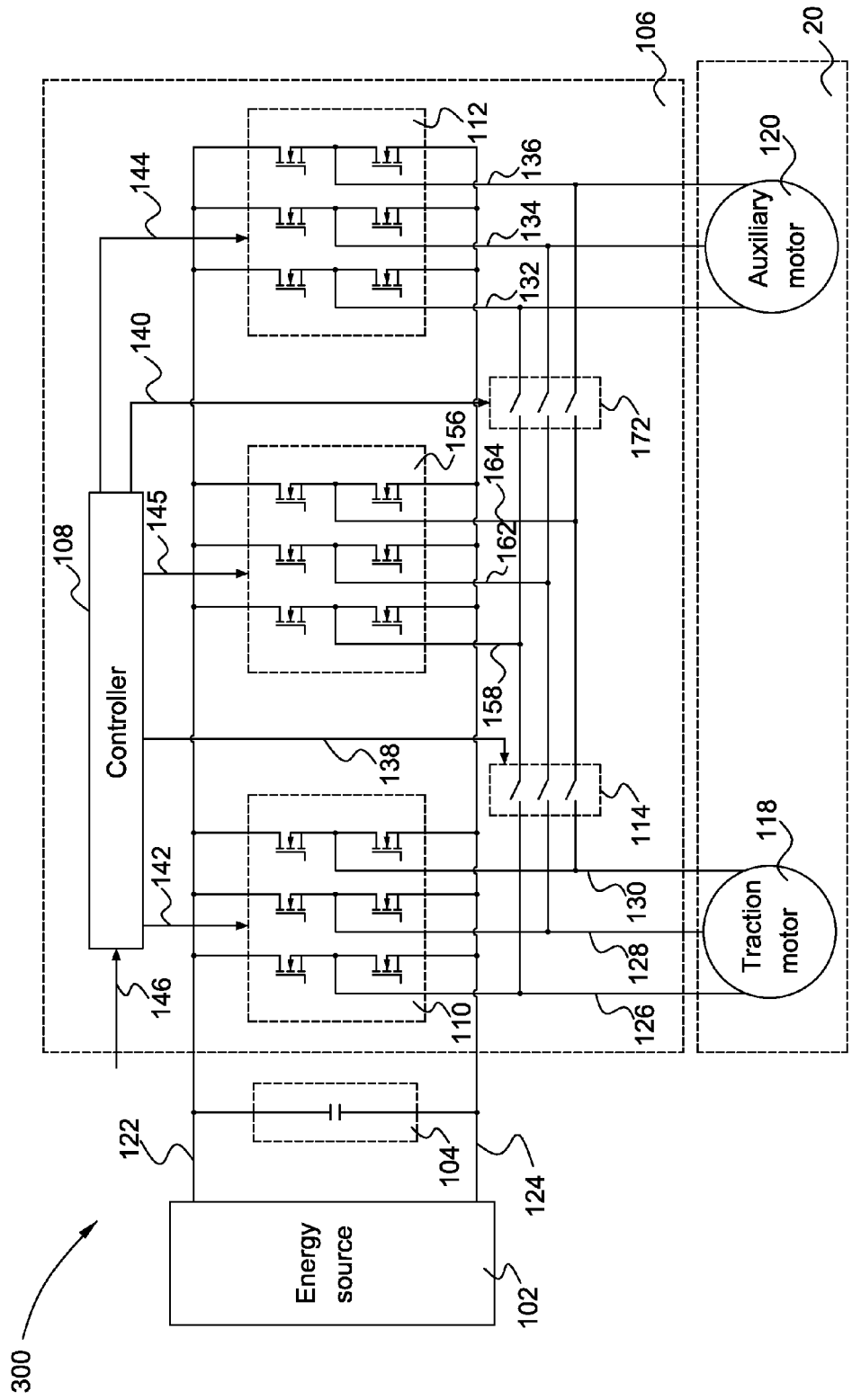
FIG. 6 is a schematic diagram of a vehicle in accordance with another exemplary embodiment of the present disclosure.

FIG. 6 illustrates a schematic diagram of a vehicle 300 in accordance with another exemplary embodiment of the present disclosure. The general structure of the vehicle 300 shown in FIG. 6 is substantially similar to the vehicle 100 shown in FIG. 1. Thus, elements which are similar as those shown in FIG. 1 are designated with the same reference numerals in the vehicle 300 shown in FIG. 6.

Similar to the vehicle 100 shown and described with reference to FIG. 1, the vehicle 300 also employs a single energy source 102 for supplying electrical power to multiple converters in an electric drive system 106. More specifically, in the illustrated embodiment of FIG. 6, the electric drive system 106 includes at least a first converter 110, a second converter 112, and a third converter 156. The first, second, and third converters 110, 112, 156 are commonly coupled to the energy source 102 via a first electrical line 122 and a second electrical line 124. In some embodiments, a DC-link 104 consisting of one or more capacitors may be electrically coupled between the energy source 102 and the three converters 110, 112, 156. The DC-link 104 functions to provide DC electrical power with a constant voltage to the input of the three converters 110, 112, 156.

The first converter 110 can be configured to perform unidirectional or bi-directional power conversions. In one embodiment, the first converter 110 is configured to convert the input electrical power provided from the energy source 102 to first output electrical power. In one embodiment, the input electrical power is a DC electrical power and the first output electrical power provided from the first converter 110 is a three-phase AC electrical power. The three-phase AC electrical power is supplied to the first load or the traction motor 118 via a first set of output electrical lines 126, 128, 130. In other embodiments, the first output electrical power may be single or multi-phase electrical power depending on the type of the load that is to be powered by the first electrical power. The first output electrical power may be solely supplied to the load system 20 or be combined with output electrical power provided from other converters.

In a particular embodiment, the first converter 110 shown in FIG. 6 is specifically designed in a manner that the maximum output electrical power capable of being provided by the first converter 110 is less than the electrical power that the first load 118 (e.g., a traction motor) requires to provide a maximum main drive power. In case the first load or the traction motor 118 is desired to provide a maximum main drive power, the first output electrical power provided from the first converter 110 can be selectively supplemented from one or more other power converters.

The second converter 112 can also be configured to perform unidirectional or bi-directional power conversions. In one embodiment, the second converter 112 is configured to convert the input electrical power provided from the energy source 102 to second output electrical power. In one embodiment, the second output electrical power provided from the second converter 112 is a three-phase AC electrical power which is supplied to the second load or the auxiliary motor 120 via a second set of output electrical lines 132, 134, 136. In other embodiments, the second output electrical power may be single or multi-phase electrical power depending on the type of the load that is to be powered by the second output electrical power. The second output electrical power may be solely provided to a second load 120 (e.g., an auxiliary motor) or combined with output electrical power provided from other converters before being supplied to the second load or the auxiliary motor 120.

In a particular embodiment, the second converter 112 shown in FIG. 6 is specifically designed in a manner that the maximum output electrical power capable of being provided from the second converter 112 is less than the electrical power that the auxiliary motor 120 requires to provide a maximum auxiliary drive power. In case the second load or the auxiliary motor 120 is desired to provide a maximum auxiliary drive power, the second electrical power provided from the second converter 112 can be selectively supplemented from one or more other converters.

The third converter 156 is configured to convert the input electrical power provided from the energy source 102 to third output electrical power. The third output electrical power can be selectively supplied to the first load or the traction motor 118 via a first switch module 114. The third output electrical power can also be selectively supplied to the second load or the auxiliary motor 120 via a second switch module 172. In one embodiment, the third output electrical power provided from the third converter 156 is a three-phase AC electrical power which is supplied to either the first load 118 or the second load 120 via a third set of output electrical lines 158, 162, 164. In other embodiments, the third output electrical power may be single or multi-phase electrical power depending on the type of the load that is to be powered by the third output electrical power. In addition, in one embodiment, the third output electrical power provided from the third converter 156 can be regulated based at least in part on the third control signals 145 provided from the controller 108.

More specifically, as shown in FIG. 6, the electric drive system 106 may further include a first switch module 114 and a second switch module 172. The first switch module 114 is electrically coupled between the outputs of the first converter 110 and the third converter 156. The first switch module 114 is configured to be switched to assume a first state in which a combined output electrical power from the first and third converters 110, 156 can be supplied to the first load 118. The first switch module 114 is also configured to be switched to assume a second state in which the first output electrical power can be solely supplied to the first load 118. The second switch module 172 is electrically coupled between the outputs of the second converter 112 and the third converter 156. The second switch module 172 is configured to be switched to assume a first state in which a combined output electrical power from the second and third converters 112, 156 can be supplied to the second load 120. The second switch module 172 is also configured to be switched to assume a second state in which the second output electrical power provided from the second converter 112 can be solely supplied to the second load 120.

Figure 7:
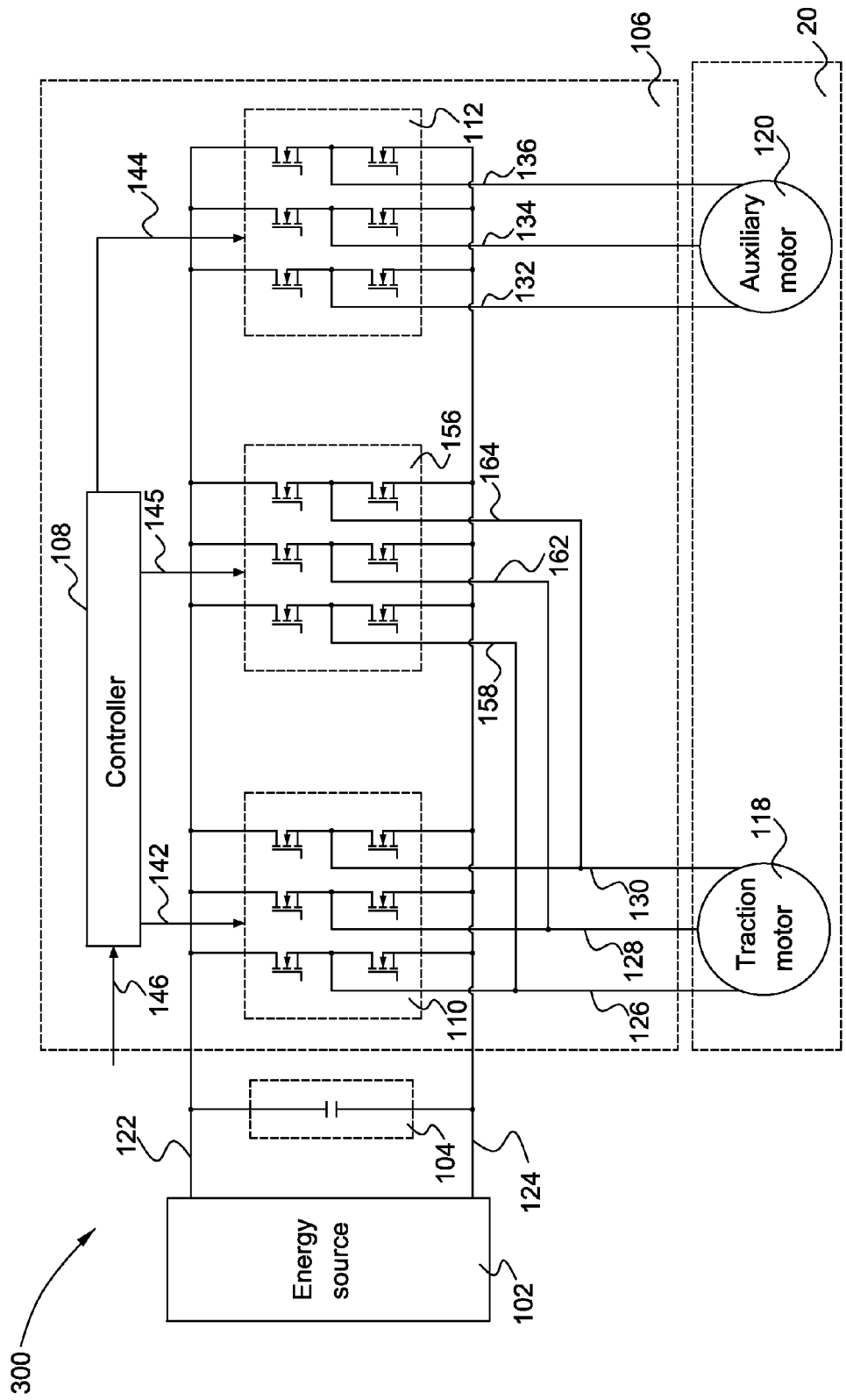
FIG. 7 is a schematic diagram of the vehicle shown in FIG. 6 operating in a first mode in accordance with an exemplary embodiment of the present disclosure.

FIG. 7 illustrates a first configuration of the vehicle 300 shown in FIG. 6 when the vehicle 300 is operating under a first operation mode in accordance with an exemplary embodiment of the present disclosure. In some embodiments, the first operation mode may be a traction mode in which the first load or traction motor 118 requires a large main drive power and the second load or the auxiliary motor 120 requires a small auxiliary drive power. In some embodiments, in the first mode or traction mode, the first converter 110 cannot satisfy the power requirements of the first load or the traction motor 118. In this case, the first switch module 114 is turned on or closed to establish a power transmission path between the traction motor 118 and the third converter 156. The third output electrical power provided from the third converter 156 can be transmitted along the power transmission path and combined with the first output electrical power provided from first converter 110. The combined electrical power is supplied to the first load or the traction motor 118 to enable to the first load or the traction motor 118 to provide a main drive power.

In some embodiments, the amount of combined electrical power can be changed to allow variable main drive power to be provided from the traction motor 118. Changing the combined electrical power can be achieved by regulating the first output electrical power according to first control signals 142 provided from the controller 108, regulating the third output electrical power according to third control signals 144 provided from the controller 108, or a combination thereof.

Still in the first operation mode, the second switch module 172 is turned off or opened to terminate a power transmission path between the second converter 112 and the second load or the auxiliary motor 120. Thus, the second load or the auxiliary motor 120 solely receives the second output electrical power from the second converter 112 and provides certain auxiliary drive power accordingly.

Figure 8:
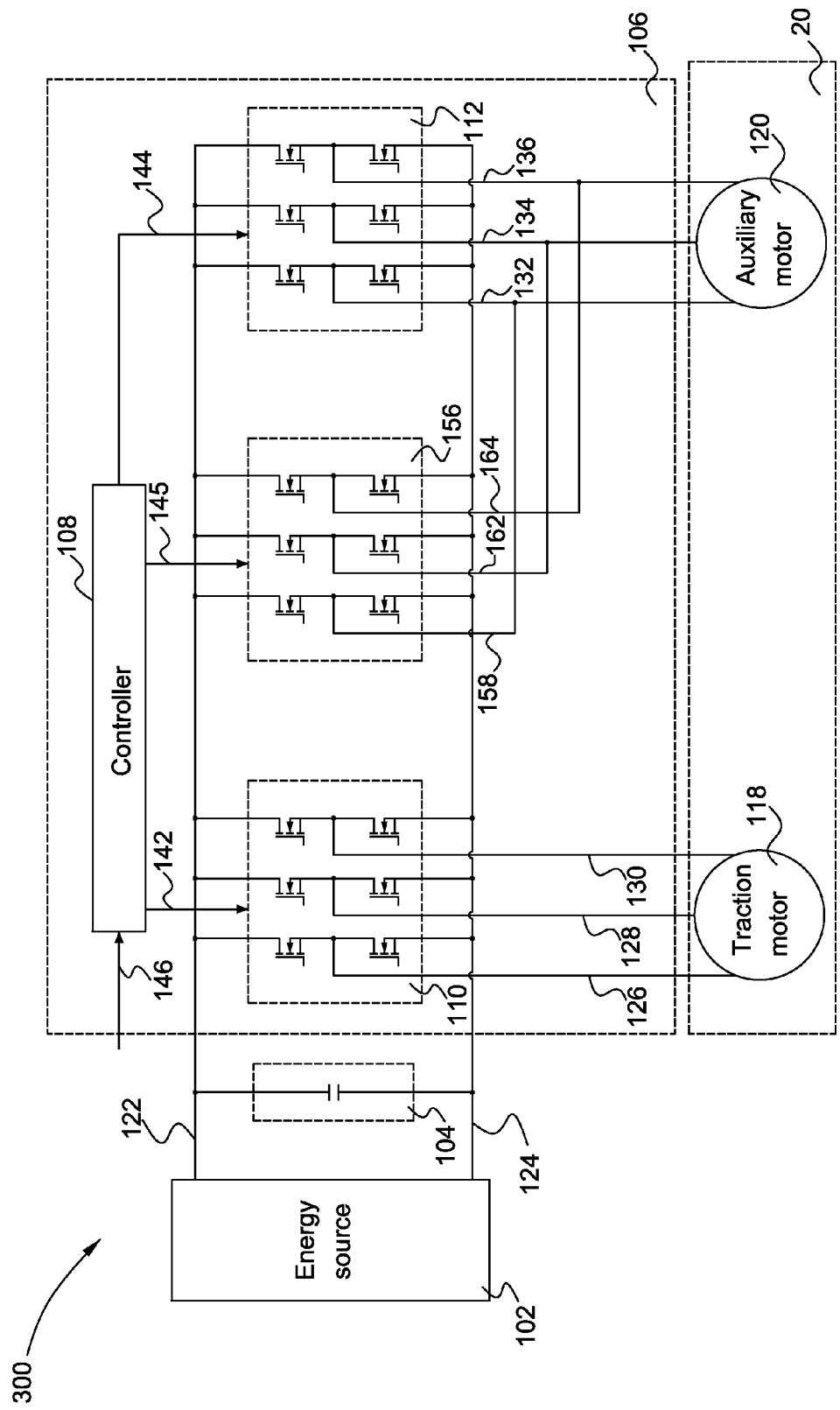
FIG. 8 is a schematic diagram of the vehicle shown in FIG. 6 operating in a second mode in accordance with an exemplary embodiment of the present disclosure.

FIG. 8 illustrates a second operation mode of the vehicle 300 shown in FIG. 6 in accordance with an exemplary embodiment of the present disclosure. In some embodiments, the second operation mode may be an auxiliary mode in which the second load or the auxiliary motor 120 is desired to provide a large auxiliary drive power while the first load or the traction motor 118 is desired to provide a small main drive power. In some embodiments, the second converter 112 may be designed that the maximum output electrical power doesn't match the electrical power that the auxiliary motor 120 requires to provide a maximum auxiliary drive power. In this case, the second switch module 172 can be turned on or closed to establish a power transmission path between the third converter 156 and the auxiliary motor 120. As such, the third output electrical power provided from the third converter 156 can be transmitted along the power transmission path and be combined with the second electrical power provided from the second converter 112. The combined electrical power is supplied to the auxiliary motor 120 to enable the auxiliary motor 120 to provide a relatively large auxiliary drive power.

Still in the second operation mode or the auxiliary mode, the first switch module 114 is turned off or opened to terminate a power transmission path between the third converter 156 and the traction motor 118. As such, the traction motor 118 solely receives the first output electrical power provided from the first converter 110 and provides relatively small main drive power accordingly.

Figure 9:
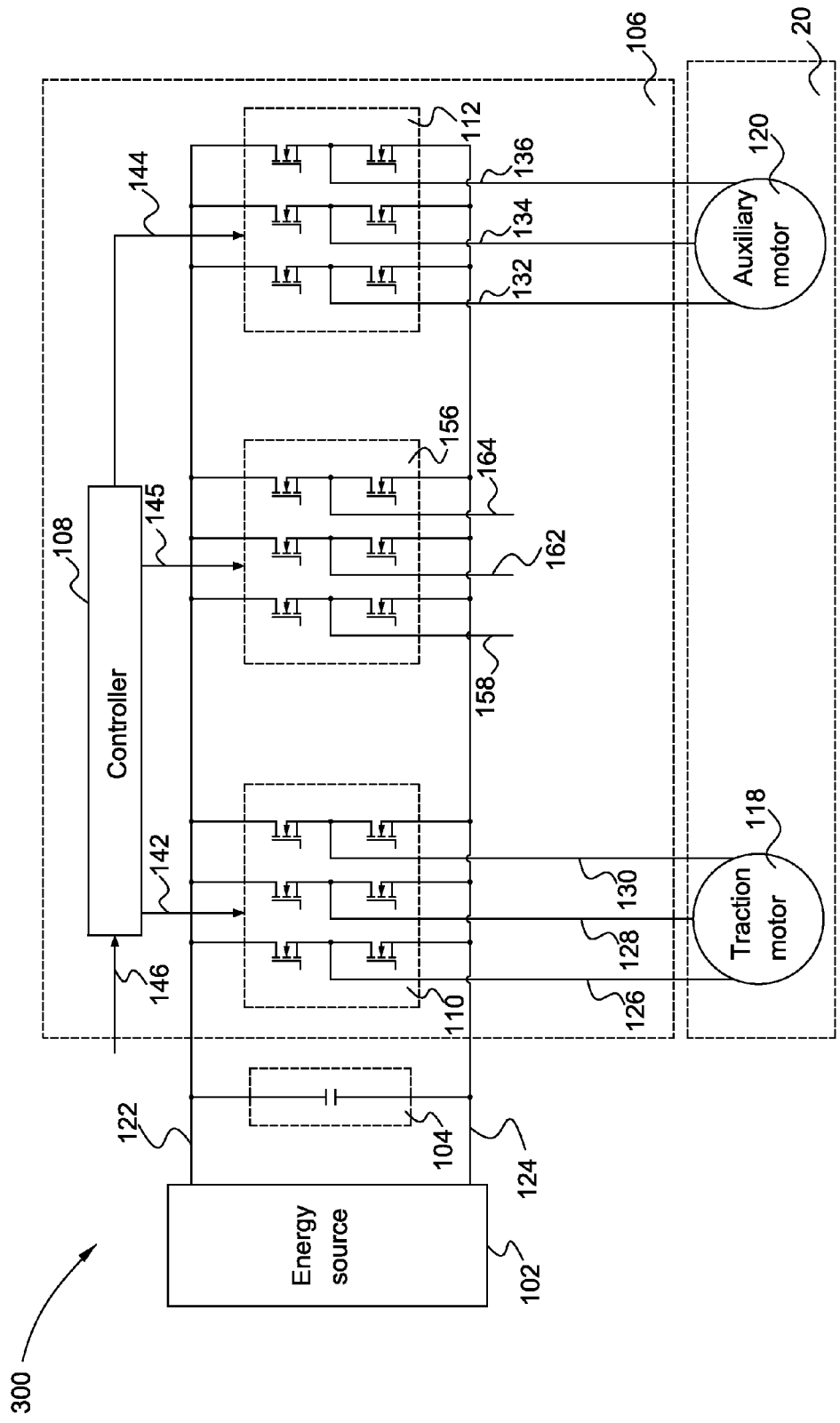
FIG. 9 is a schematic diagram of the vehicle shown in FIG. 6 operating in a third mode in accordance with an exemplary embodiment of the present disclosure.

FIG. 9 illustrates a third operation mode of the vehicle 300 shown in FIG. 6 in accordance with an exemplary embodiment of the present disclosure. In some embodiments, the third operation mode may be an independent operation mode in which the first converter 110 is able to supply sufficient electrical power to the first load or the traction motor 118 and the second converter 112 is able to supply sufficient electrical power to the second load or the auxiliary motor 120. In this case, the first switch module 114 can be turned off or opened to terminate the power transmission path between the third converter 156 and the first load or the traction motor 118. The first load or the traction motor 118 solely receives the first output electrical power provided from the first converter 110 and provides necessary main drive power for driving movement of the vehicle 300.

Still in the third operation mode, the second switch module 172 is turned off or opened to terminate the power transmission path between the third converter 112 and the second load or the auxiliary motor 120. Thus, the second load or the auxiliary motor 120 only receives the second electrical power provided from the second converter 112 and provides necessary auxiliary drive power for performing certain tasks such as plowing ground and lifting materials.

Figure 10:
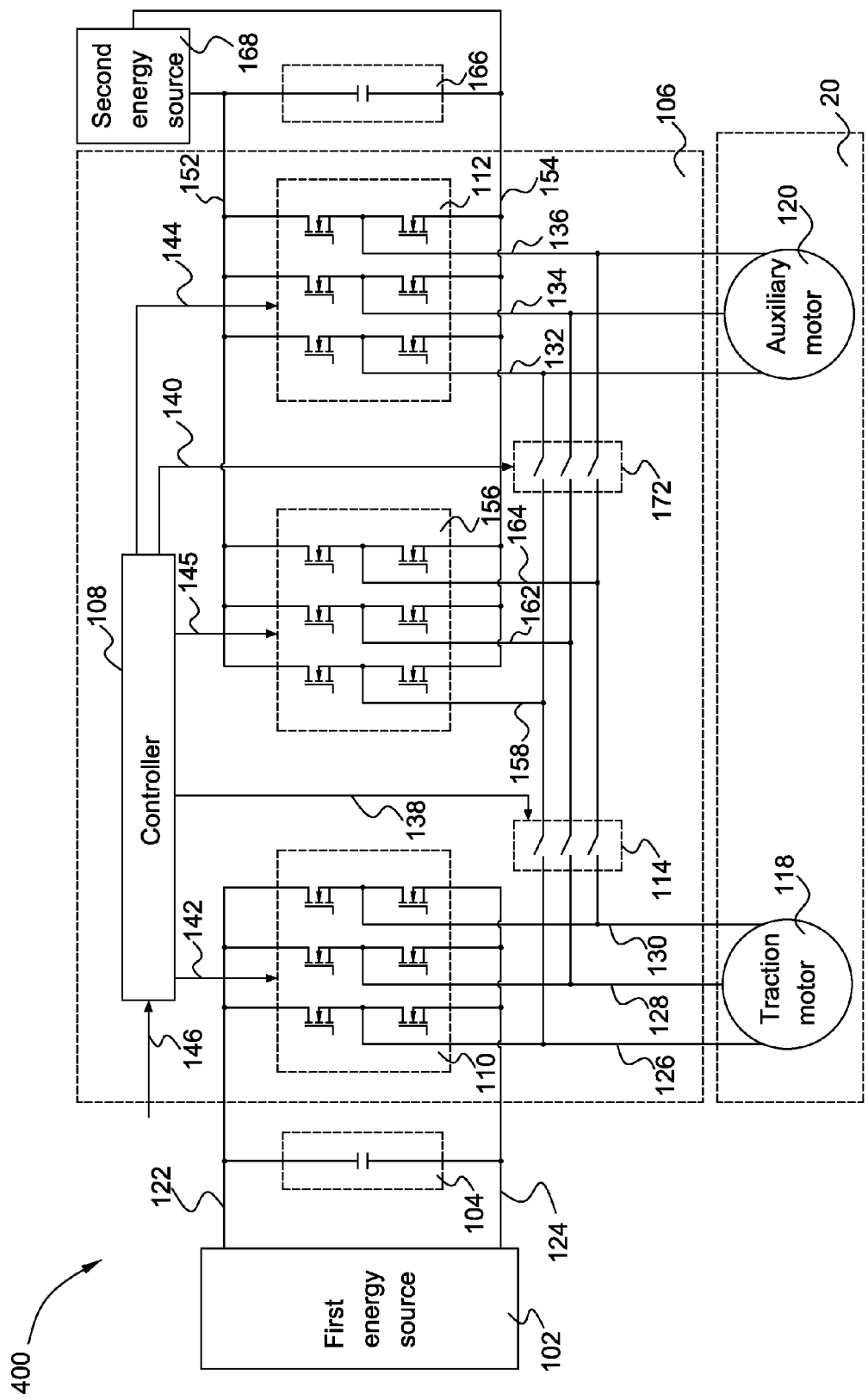
FIG. 10 is a schematic diagram of a vehicle in accordance with another exemplary embodiment of the present disclosure.

FIG. 10 illustrates a schematic diagram of a vehicle 400 in accordance with another exemplary embodiment of the present disclosure. The general structure of the vehicle 400 shown in FIG. 10 is substantially similar to the vehicle 300 shown in FIG. 6. Thus, elements which are similar as those shown in FIG. 6 are designated with the same reference numerals in the vehicle 400 shown in FIG. 10.

One of the differences of the vehicle 400 shown in FIG. 10 with respect to the vehicle 300 shown in FIG. 6 is that the electric drive system 106 is configured to be powered by at least a first energy source 102 and a second energy source 168. More specifically, the first energy source 102 is electrically coupled to a first converter 110 via a first input electrical line 122 and a second input electrical line 124. The first converter 110 may include a DC-AC converter (also be referred to as inverter) which is configured to convert DC electrical power provided from the first energy source 102 to first three-phase AC electrical power. The second energy source 168 is electrically coupled to both the second converter 112 and the third converter 156 via a third input electrical line 152 and a fourth input electrical line 154. The second converter 112 may be a DC-AC converter which is configured to convert second DC electrical power provided from the second energy source 168 to second three-phase AC electrical power. The third converter 156 may also be a DC-AC converter which is configured to convert the second DC electrical power provided from the second energy source 168 to third three-phase AC electrical power. In some embodiments, a second DC-link 166 consisting of one or more capacitors may be coupled between the second energy source 168 and the second and third converters 112, 156.

Further referring to FIG. 10, the electric drive system 106 also includes a first switch module 114 and a second switch module 172. The first switch module 114 is electrically coupled to the outputs of the first and third converters 110, 156. The first switch module 114 is configured to be switched on and/or off to establish and terminate power transmission path such that the third three-phase AC electrical power can be selectively supplied to the first load or the traction motor 118. The second switch module 172 is electrically coupled to the outputs of the second and third converters 112, 156. The second switch module 112 is configured to be switched on and/or off to establish or terminate power transmission path such that the third electrical power provided from the third converter 156 can be selectively supplied to the second load or the auxiliary motor 120.

Similar to what has been described above with reference to FIGS. 6-8, the first and second switch modules 114, 172 can be switched on and/or off to enable the vehicle 400 to operate under different operation modes. For example, when the vehicle 400 is operating under a first operation mode, the first switch module 114 is turned on or closed and the second switch module 172 is turned off or opened. In this case, the first three-phase AC electrical power provided from the first converter 110 and the third three-phase AC electrical power provided from the third converter 156 are combined. The combined three-phase electrical power is supplied to the first load or the traction motor 118 to enable the traction motor 118 to provide a large drive power (e.g., a large traction torque). In the first operation mode, the second load or the auxiliary motor 120 is solely powered by the second three-phase AC electrical power provided from the second converter 112, such that the auxiliary motor 120 can provide necessary auxiliary drive power to perform certain tasks such as plowing ground and lifting materials.

When the vehicle 400 shown in FIG. 10 is operating under a second operation mode, the first switch module 114 is turned off and second switch module 172 is turned on. In this case, the first load or the traction motor 118 only receives the first three-phase AC electrical power provided from the first converter 110 and provides certain amount of main drive power accordingly. The second load or the auxiliary motor 120 receives a combination of the second three-phase AC electrical power provided from the second converter 112 and the third three-phase AC electrical power provided from the third converter 156. In some circumstances, the second load or the auxiliary motor 120 may provide maximum auxiliary power to perform certain tasks such as plowing ground and lifting materials.

When the vehicle 400 shown in FIG. 10 is operating under a third operation mode, both the first and second switch modules 114, 172 are turned off or opened. In this case, the first load or the traction motor 118 only receives the first three-phase AC electrical power provided from the first converter 110 and provides certain amount of main drive power accordingly. The second load or the auxiliary motor 120 only receives the second three-phase AC electrical power provided from the second converter 112 and provided certain amount of auxiliary drive power to perform certain tasks such as plowing ground and lifting materials.

Figure 11:
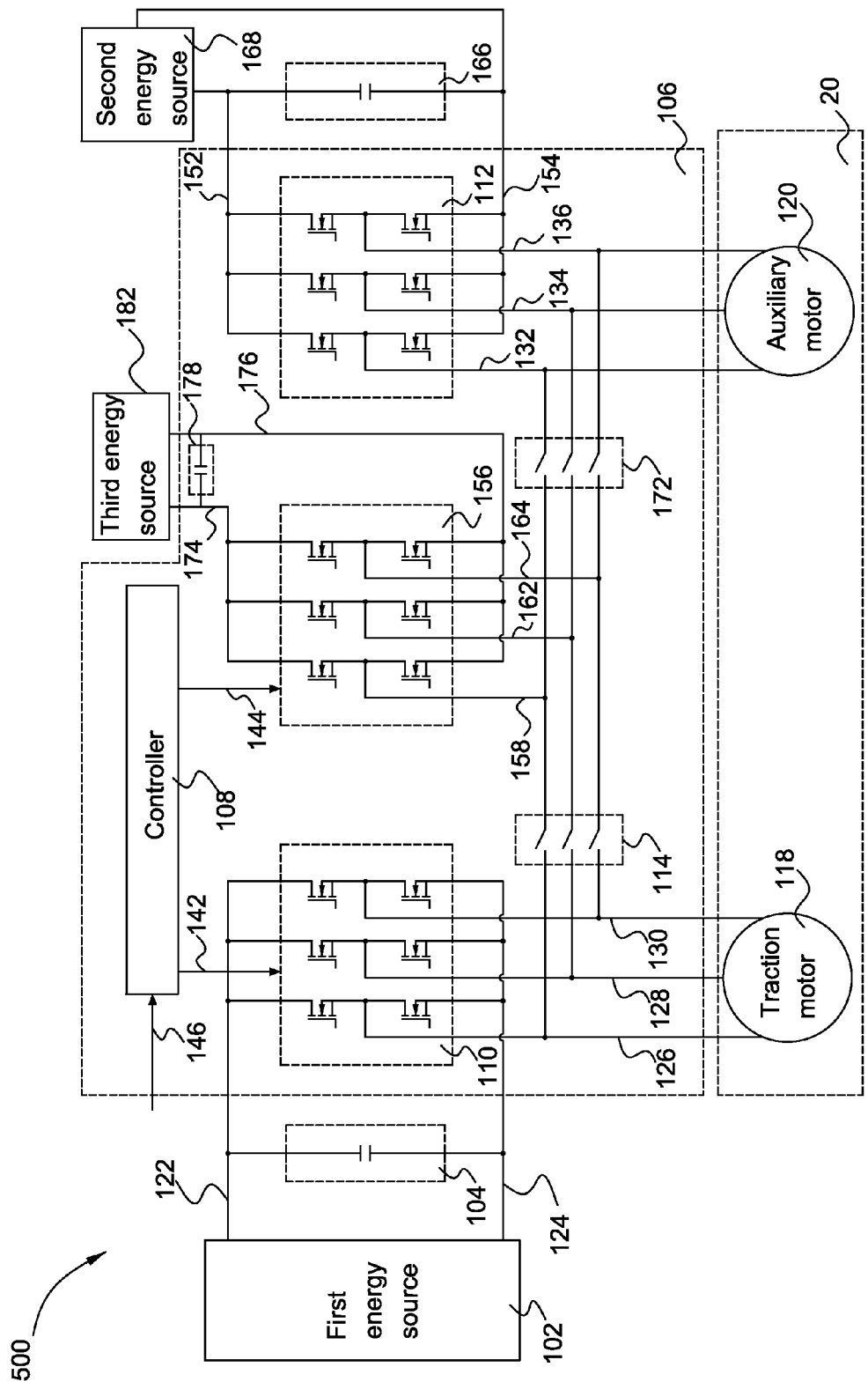
FIG. 11 is a schematic diagram of a vehicle in accordance with another exemplary embodiment of the present disclosure.

FIG. 11 illustrates a schematic diagram of a vehicle 500 in accordance with another exemplary embodiment of the present disclosure. The general structure of the vehicle 500 shown in FIG. 11 is substantially similar to the vehicle 300 shown in FIG. 6. Thus, elements that are similar as those shown in FIG. 6 are designated with the same reference numerals in the vehicle 500 shown in FIG. 11.

One of the differences of the vehicle 500 shown in FIG. 11 with respect to the vehicle 300 shown in FIG. 6 is that the electric drive system 106 is powered by at least a first energy source 102, a second energy source 168, and a third energy source 182. In some embodiments, the first, second, and third energy sources 102, 168, 182 may be of the same type of the energy supply means. For example, all of the first, second, and third energy sources 102, 168, 182 may use battery or battery packs for supplying electrical power to electric drive system 106. In other embodiments, the first, second, and third energy sources 102, 168, 182 may use different type of energy supply means. For example, the first and second energy sources 102, 168 may use battery or battery packs to supply electrical power, whereas the third energy source 182 may use ultra-capacitors to supply electrical power.

The first energy source 102 is electrically coupled to the first converter 110 via a first input electrical line 122 and a second input electrical line 124. In some embodiments, a first DC-link 104 consisting of one or more capacitors can be electrically coupled between the first energy source 102 and the first converter 110. The first converter 110 is configured to convert first input electrical power (e.g., first DC electrical power) provided from the first energy source 102 to first output electrical power (e.g., first three-phase AC electrical power). In one embodiment, the first three-phase AC electrical power is transmitted along first set of electrical lines 126, 128, 130 to the first load or the traction motor 118.

The second energy source 168 is electrically coupled to the second converter 112 via a third input electrical line 152 and a fourth input electrical line 154. In some embodiments, a second DC-link 166 consisting of one or more capacitors can be electrically coupled between the second energy source 168 and the second converter 112. The second converter 112 is configured to convert second input electrical power (e.g., second DC electrical power) to second output electrical power (e.g., second three-phase AC electrical power). As shown in FIG. 11, the second three-phase AC electrical power may be transmitted along second set of output electrical lines 132, 134, 136 to the second load or the auxiliary motor 120.

The third energy source 182 is electrically coupled to the third converter 156 via a fifth input electrical line 174 and a sixth input electrical line 176. In some embodiments, a third DC-link 178 may be coupled between the third energy source 182 and the third converter 156. The third converter 156 is configured to convert third input electrical power (e.g., third DC electrical power) to third output electrical power (e.g., third three-phase AC electrical power). Depending on the operation modes of the vehicle 500, the third three-phase AC electrical power may be selectively transmitted to the traction motor 118 or the auxiliary motor 120 by operating the first switch module 114 and the second switch module 172, respectively.

More specifically, in a first operation mode, the first switch module 114 may be turned on or closed to allow the third three-phase AC electrical power to be supplied to the traction motor 118 at least through third set of output electrical lines 158, 162, 164. Therefore, the traction motor 118 can be operated to provide large drive power such as traction torque according to a combination of the first and third three-phase AC electrical power. In the meantime, the second switch module 172 can be turned off or opened to allow the auxiliary motor 120 to be solely powered by the second converter 112. As a result, the auxiliary motor 120 can still be operated to provide certain auxiliary drive power to perform certain tasks.

In a second operation mode, the second switch module 172 may be turned on or closed to allow the third three-phase AC electrical power to be supplied to the auxiliary motor 120 at least through third set of output electrical lines 158, 162, 164. Therefore, the auxiliary motor 120 can be operated to provide large auxiliary drive power to perform specific tasks such as plowing ground and lifting materials. In the meantime, the first switch module 114 can be turned off or opened to allow the traction motor 118 to be solely powered by the first converter 110.

In a third operation mode, both the first and second switch modules 114, 172 may be turned off or opened and the third converter 156 stops providing the third three-phase AC electrical power. In this case, the traction motor 118 is solely powered by the first converter 110 and the auxiliary motor 120 is solely powered by the second converter 112.

While the invention has been described with reference to exemplary embodiments, it will be understood by those skilled in the art that various changes may be made and equivalents may be substituted for elements thereof without departing from the scope of the invention. Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus, comprising:
   at least one energy source;
   a bi-directional DC/DC converter coupled to the energy source; and
   a drive system coupled to the DC/DC converter comprising:
   a first converter coupled to a first load;
   a second converter coupled to an auxiliary load;
   a third converter;
   a first switch module coupled to both an output of the first converter and an output of the third converter; and
   a second switch module coupled to both an output of the second converter and an output of the third converter; and
   a controller configured to:
   switch off both the first and second switch modules to allow the first load to be powered by the first converter and the auxiliary load to be powered by the second converter in a first mode;
   switch on the first switch module and switch off the second switch module to allow the first load to be powered by both the first converter and third converter, and the auxiliary load to be powered by the second converter in a second mode; and
   switch off the first switch module and switch on the second switch module to allow the first load to be powered by the first converter, and the auxiliary load to be powered by both the second converter and third converter in a third mode.

2. The apparatus of claim 1, wherein the at least one energy source comprises:
   a first energy source coupled to the first converter; and
   a second energy source coupled to the second converter.

3. The apparatus of claim 1, wherein the controller is further configured to operate the bi-directional DC/DC converter.

4. The apparatus of claim 1, wherein the first load comprises a traction electric motor.

5. The apparatus of claim 1, wherein the auxiliary load comprises a power take-off (PTO) electric motor.

6. A vehicle, comprising:
   a first converter coupled to a first electric motor;
   a second converter coupled to a second electric motor;
   a third converter;
   a first switch module coupled to both an output of the first converter and an output of the third converter;
   a second switch module coupled to both an output of the second converter and an output of the third converter; and
   a controller configured to:
   switch off both the first and second switch modules to allow the first electric motor to be powered by the first converter and the second electric motor to be powered by the second converter in a first mode;
   switch on the first switch module and switch off the second switch module to allow the first electric motor to be powered by both the first converter and third converter, and the second electric motor to be powered by the second converter in a second mode; and
   switch off the first switch module and switch on the second switch module to allow the first electric motor to be powered by the first converter, and the second electric motor to be powered by both the second converter and third converter in a third mode.

7. The vehicle of claim 6, further comprising an energy source coupled to the first converter, the second converter, and the third converter.

8. The vehicle of claim 6, further comprising:
   a first energy source coupled to the first converter; and
   a second energy source coupled to the second converter and the third converter.

9. The vehicle of claim 6, further comprising:
   a first energy source coupled to the first converter;
   a second energy source coupled to the second converter; and
   a third energy source coupled to the third converter.

10. The vehicle of claim 6, wherein the first electric motor and the second electric motor comprise three-phase AC motors.

11. The vehicle of claim 6, wherein the first electric motor comprises a traction electric motor.

12. The vehicle of claim 6, wherein the second electric motor comprises a power take-off (PTO) motor.

13. A system, comprising:
   a first energy source coupled to a first converter;
   a second energy source coupled to both a second converter and a third converter;
   a first load coupled to the first converter;
   a second load coupled to the second converter;
   a first switch module coupled to an output of the first converter and an output of the third converter;
   a second switch module coupled to the output of the second converter and an output of the third converter; and
   a controller configured to:
   switch off both the first and second switch modules to allow the first load to be powered by the first converter and the second load to be powered by the second converter in a first mode;
   switch on the first switch module and switch off the second switch module to allow the first load to be powered by both the first converter and third converter, and the second load to be powered by the second converter in a second mode; and
   switch off the first switch module and switch on the second switch module to allow the first load to be powered by the first converter, and the second load to be powered by both the second converter and third converter in a third mode.

14. The system of claim 13, wherein the first load comprises a traction electric motor.

15. The system of claim 13, wherein the second load comprises a power take-off (PTO) electric motor.

* * * * *